United States Patent
Foote et al.

(10) Patent No.: US 7,055,390 B2
(45) Date of Patent: Jun. 6, 2006

(54) SEAL ASSEMBLY WITH MEANS FOR DETECTING SEAL FAILURE

(76) Inventors: Dean Foote, 4128-147 Street, Edmonton, Alberta (CA) T6H 5V1; Clayton Delbridge, 2427-106 Street, Edmonton, Alberta (CA) T6J 4N1; Scott Delbridge, 155 Highwood Crescent, Devon, Alberta (CA) T9G 1W6

(*) Notice: Subject to any disclaimer, the term of this patent is extended or adjusted under 35 U.S.C. 154(b) by 148 days.

(21) Appl. No.: 10/696,411

(22) Filed: Oct. 28, 2003

(65) Prior Publication Data

US 2004/0083818 A1 May 6, 2004

(30) Foreign Application Priority Data

Oct. 28, 2002 (CA) .................................. 2410218

(51) Int. Cl.
*G01L 7/00* (2006.01)

(52) U.S. Cl. ........................................ 73/700; 277/355
(58) Field of Classification Search .................. 73/156, 73/700; 277/355, 370

See application file for complete search history.

(56) References Cited

U.S. PATENT DOCUMENTS

| 4,569,220 | A  | * | 2/1986  | Hopfe et al. ................... 73/1.17 |
| 5,669,636 | A  | * | 9/1997  | Kubala ........................... 285/98 |
| 5,760,292 | A  |   | 6/1998  | Jostein ............................ 73/46 |
| 6,173,961 | B1 | * | 1/2001  | Martin ........................ 277/353 |
| 6,623,238 | B1 | * | 9/2003  | Langston et al. ............ 415/112 |
| 6,626,438 | B1 | * | 9/2003  | Walden ....................... 277/510 |
| 6,644,667 | B1 | * | 11/2003 | Grondahl ..................... 277/355 |
| 2001/0028845 | A1 | * | 10/2001 | Langston et al. ........ 415/122.1 |
| 2002/0117806 | A1 | * | 8/2002  | Grondahl ..................... 277/355 |
| 2003/0160395 | A1 | * | 8/2003  | Walden ....................... 277/584 |
| 2004/0055646 | A1 | * | 3/2004  | Robinson et al. ............ 137/510 |
| 2004/0083818 | A1 | * | 5/2004  | Foote et al. ................... 73/756 |

* cited by examiner

*Primary Examiner*—Edward Lefkowitz
*Assistant Examiner*—Andre Allen
(74) *Attorney, Agent, or Firm*—Christenson O'Connor Johnson Kindness PLLC

(57) ABSTRACT

A seal assembly includes a first body and a second body. A primary seal is disposed between the first body and the second body. A secondary seal is disposed between the first body and the second body in spaced relation to the primary seal. A pressure port extends through one of the first body and the second body between the primary seal and the secondary seal. A pressure sensor is provided for detecting a pressure increase within the pressure port, thereby indicating a failure of the primary seal.

5 Claims, 1 Drawing Sheet

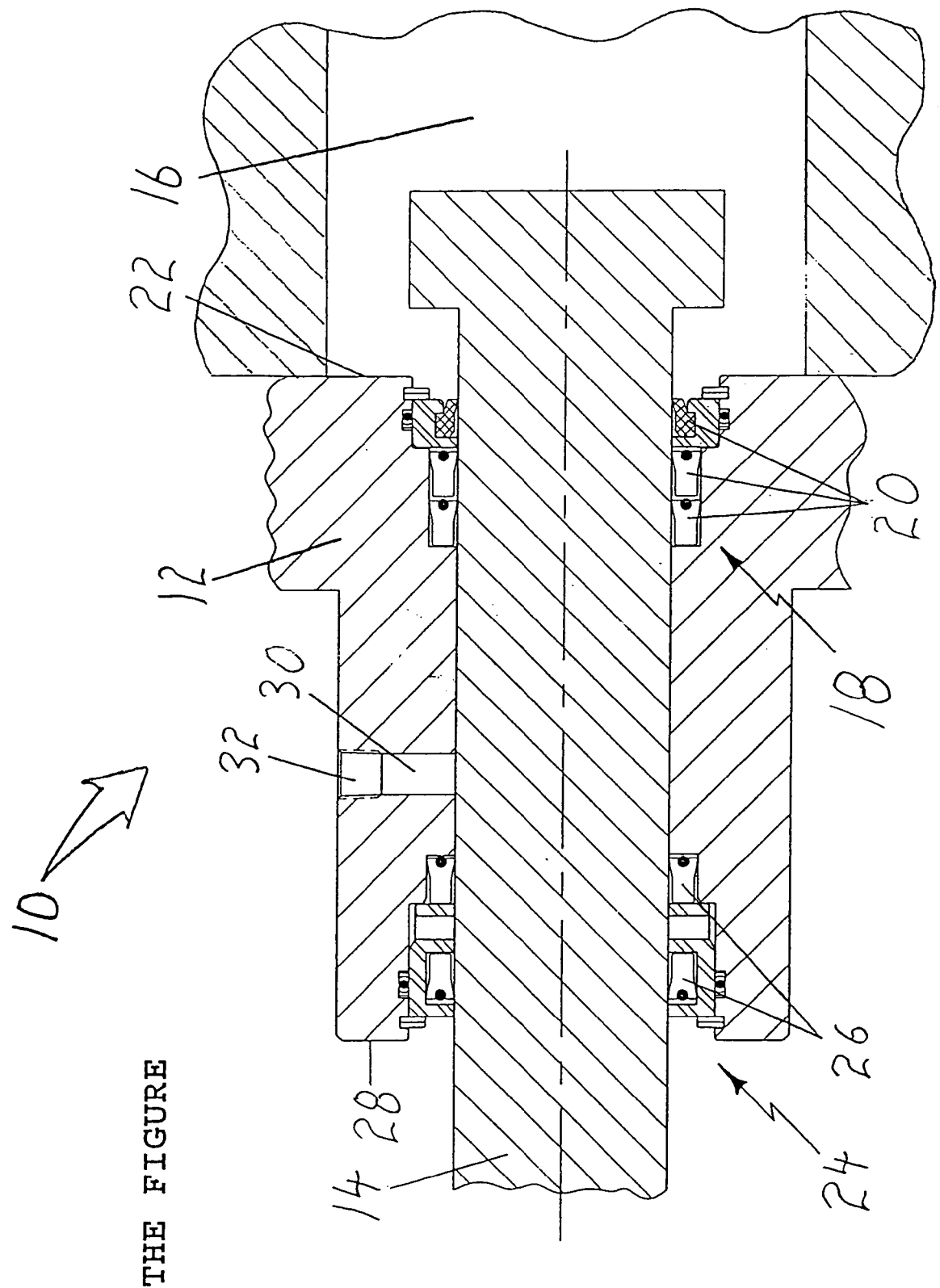

SEAL ASSEMBLY WITH MEANS FOR DETECTING SEAL FAILURE

FIELD OF THE INVENTION

The present invention relates to a seal assembly with means for detecting seal failure

BACKGROUND OF THE INVENTION

In order to guard against seal failure, seal assemblies are provided which include a primary seal and one or more secondary seals. The secondary seals do not bear any critical pressures until such time as the primary seal fails.

SUMMARY OF THE INVENTION

What is required is a seal assembly which includes means for detecting failure of the primary seal, so that the operator is made aware that critical pressures are now being borne by secondary seals.

According to the present invention there is provided a seal assembly which includes a first body and a second body. A primary seal is disposed between the first body and the second body. A secondary seal is disposed between the first body and the second body in spaced relation to the primary seal. A pressure port extends through one of the first body or the second body between the primary seal and the secondary seal. Means is provided for detecting a pressure increase within the pressure port, thereby indicating a failure of the primary seal.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

THE FIGURE is a side elevation view, in section, of a seal assembly with means for detecting seal failure constructed in accordance with the teachings of the present invention.

DETAILED DESCRIPTION OF THE PREFERRED EMBODIMENT

The preferred embodiment, a seal assembly generally identified by reference numeral 10, will now be described with reference to THE FIGURE.

Structure and Relationship of Parts:

Referring to THE FIGURE, there is illustrated a detailed view of a portion of a blow out preventer. This illustration has been selected to demonstrate the teachings of the present invention. A main body of the blow out preventer is identified as a first body 12. A bore 13 extends through first body 12. A reciprocally movable shaft which carries the sealing rams of the blow out preventer is identified as second body 14. Although a reciprocally movable shaft is shown, the teachings of this invention apply equally to a rotating shaft. Second body 14 is positioned within first body 12 under close tolerances. A primary seal grouping 18, having several annular seals 20, is disposed between first body 12 and second body 14. Drilling fluids under pressure are positioned in cavity 16. Primary seal grouping 18 seals prevent entry of drilling fluids from first end 22. A secondary seal grouping 24, including several annular seals 26 is disposed between first body 12 and second body 14 in spaced relation to primary seal grouping 18 and embedded in opposed end 28 of first body 12. A pressure port 30 extends through first body 12 to second body 14 between primary seal grouping 18 and secondary seal grouping 24. A pressure sensor 32 is provided for detecting an increase in pressure within pressure port 30.

Operation

The use and operation of seal assembly with means for detecting seal failure generally identified by reference numeral 10, will now be described with reference to THE FIGURE. If seals on a blow out preventer fail, the equipment can no longer function as intended to contain well pressure. As long as primary seal grouping 18 is functioning, drilling fluids are kept out of pressure port 30 and relatively little pressure is detected by pressure sensor 32. In the event, primary seal grouping 18 fails, secondary seal grouping 24 will be forced to contain any pressure. When this occurs there will be a dramatic rise in pressure in pressure port 30, which will be detected by pressure sensor 32. By connecting pressure sensor to a visual or audible alarm, a warning can be given that primary seal grouping 18 has failed and that the blow out preventer is now operating solely upon its secondary seal grouping 24. This enables the user to perform required tasks using the blow out preventer, with a view to arranging servicing to replace primary seal grouping 18, as soon as the blow out preventer can be conveniently taken out of service. In the absence of the present invention, the failure of primary seal grouping 18 could go unnoticed. If that were the case, the blow out preventer would cease to function upon failure of secondary seal grouping 24, with potentially disastrous consequences. With the present invention, the condition of primary seal grouping 18 is continuously being monitored.

The actual configuration of primary seal grouping 18 and secondary seal grouping 24 is not material to the invention and will, therefore, not be further described. It will be appreciated that the principle is equally applicable to a single primary seal as to primary seal grouping. The illustration and discussion relating to the environment of a blow out preventer is for purposes of illustration only.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The invention claimed is:

1. A seal assembly, comprising:
   a first body;
   a second body;
   a non-weeping primary seal disposed between the first body and the second body and adapted to seal critical pressure coming from a single direction;
   a redundant secondary seal, serving no other purpose but to back up the primary seal in the event of failure of the primary seal, disposed between the first body and the second body in spaced relation to the primary seal and shielded from the critical pressure by the primary seal;

a non-weeping pressure port extending through one of the first body or the second body between the primary seal and the secondary seal; and means for detecting a pressure increase within the pressure port, thereby indicating a failure of the primary seal.

2. The seal assembly as defined in claim 1, wherein the second body is positioned within the first body.

3. The seal assembly as defined in claim 2, wherein the second body is a shaft which does one of reciprocates or rotates.

4. The seal assembly as defined in claim 3, wherein both the primary seal and the secondary seals are annular seals.

5. A seal assembly, comprising:

a first body;

a second body in the form of a shaft disposed within the first body, the shaft being capable of one of reciprocating or rotating;

a non-weeping primary seal grouping including several annular seals disposed between the first body and the second body, and adapted to seal critical pressure coming from a single direction;

a redundant secondary seal grouping serving no other purpose but to back up the primary seal grouping in the event of failure of the primary seal grouping, the secondary seal grouping including several annular seals disposed between the first body and the second body in spaced relation to the primary seal grouping and shielded from the critical pressure by the primary seal grouping;

a non-weeping pressure port extending through the first body between the primary seal grouping and the secondary seal grouping; and a pressure sensor for detecting an increase in pressure within the pressure port, thereby indicating a failure of the primary seal grouping.

* * * * *